(12) United States Patent
Grunewalder et al.

(10) Patent No.: US 7,498,061 B2
(45) Date of Patent: Mar. 3, 2009

(54) METHOD FOR REDUCING FACE CHECKING OF A WOOD PRODUCT

(75) Inventors: John F. Grunewalder, Greensboro, NC (US); Randall R. Brown, High Point, NC (US); Randolph G. Cox, High Point, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 404 days.

(21) Appl. No.: 11/016,581

(22) Filed: Dec. 17, 2004

(65) Prior Publication Data

US 2006/0134435 A1    Jun. 22, 2006

(51) Int. Cl.
*B05D 7/06*    (2006.01)
(52) U.S. Cl. .................................... 427/397
(58) Field of Classification Search .............. 427/397; 528/88
See application file for complete search history.

(56) References Cited

U.S. PATENT DOCUMENTS

| | | | |
|---|---|---|---|
| 3,776,752 A | 12/1973 | Craven | 117/10 |
| 4,038,257 A | 7/1977 | Suzuki et al. | 260/75 |
| 4,582,730 A | 4/1986 | Elser et al. | 427/393 |
| 5,149,729 A | 9/1992 | Englund | 524/366 |
| 5,990,228 A | 11/1999 | Eichman et al. | 524/529 |
| 6,228,433 B1 * | 5/2001 | Witt | 427/487 |
| 2002/0110643 A1 | 8/2002 | Sokol | 427/384 |
| 2003/0050390 A1 | 3/2003 | Weikard et al. | 524/589 |
| 2004/0038062 A1 | 2/2004 | Burton et al. | 428/528 |

FOREIGN PATENT DOCUMENTS

| | | |
|---|---|---|
| EP | 0 168 173 B1 | 1/1989 |
| GB | 1373785 | 11/1974 |
| SU | 684868 A | 8/1985 |
| WO | 03/106124 A1 | 12/2003 |

OTHER PUBLICATIONS

Friebel, Stefan and Hora, Guido, "High Performance UV-Curing Coatings for Exterior Applications," *Woodcoatings: Challenges and Solutions in the 21th Century*, pp. 1-7.
Heckl, Siegfried and Oggenmuller, Hubert, "Fillers in UV-Cured Wood Coatings: Characteristics of the Use of Neuburg Silica," *Farbe & Lack*, vol. 103 (1997), pp. 70-77.
Chang S-T et al: "Photodiscoloration inhibition of wood coated with UV-curable acrylic clear coatings and its elucidation". Polymer Degradation and Stability, Barking, GB, vol. 69, No. 3, Sep. 1, 2000, pp. 355-360, XP004295007 ISSN: 0141-3910 the whole document.

* cited by examiner

*Primary Examiner*—Thao T. Tran
(74) *Attorney, Agent, or Firm*—Diane R. Meyers; Donald R. Palladino

(57) ABSTRACT

Methods for reducing face checking in wood products are disclosed. The methods generally include applying to at least a portion of the wood product a coating having a (meth) acrylate moiety and a pigment, wherein the cured coating has a Tg of less than 55° C.

18 Claims, No Drawings

METHOD FOR REDUCING FACE CHECKING OF A WOOD PRODUCT

FIELD OF THE INVENTION

The present invention is directed to methods for reducing face checking of a wood product by coating at least a portion of the wood product with a composition comprising a (meth) acrylate moiety and a pigment, wherein the cured coating has a Tg of less than 55° C.

BACKGROUND INFORMATION

Wood products are desired and used in a number of industries, such as furniture, flooring, millwork and cabinets. Wood products, such as those made from wood, veneers and wood composites, will often contain more than one substrate, and can comprise, for example, multiple plies. In the case of veneer, for example, a thin piece of wood is applied over wood or wood composite products such as plywood or medium density fiberboard ("mdf"). The use of veneer and other wood composites is therefore often desired, as it gives the appearance of a solid wood without the cost. The thin layer of wood, however, is subject to cracking or "checking", particularly upon exposure to hot and cold cycles. Cracks in the veneer can also occur because of humidity and the like; similarly, solid wood can crack due to exposure to environmental conditions. Methods for reducing, if not eliminating, checking on the face of a wood product (i.e. "face checking") are desired.

SUMMARY OF THE INVENTION

The present invention is directed to a method for reducing face checking of a wood product comprising coating at least a portion of the wood product with a composition comprising a (meth)acrylate moiety and a pigment, wherein the coating, when cured, has a Tg of less than 55° C. Wood products treated according to these methods are also within the scope of the present invention.

DETAILED DESCRIPTION OF THE INVENTION

The present invention is directed to methods for reducing face checking of a wood product comprising coating at least a portion of the wood product with a composition comprising a (meth)acrylate moiety and a pigment, wherein the coating, when cured, has a glass transition temperature ("Tg") of less than 55° C. In certain embodiments the Tg can be 35° C. or less. The term "wood product" as used herein refers to any product comprising wood, and can include solid wood, hardwood, or products having at least two ply, the outermost ply being wood. Examples of such products include veneers, composites, and plywood. "Face checking" refers to the cracking or splitting that occurs at the surface of a wood product, which may or may not extend to varying depths below the surface of the wood product and/or which may rise above the surface with or without splitting.

The compositions used in the present methods comprise a (meth)acrylate moiety. The term "(meth)acrylate moiety" as used herein refers to any compound that has at least one (meth)acrylate functional group. "Meth(acrylate)" refers both to methacrylate and acrylate. Any (meth)acrylate moiety can be used, provided it gives the desired flexibility to the coating composition. Examples include urethane (meth)acrylates, such as those commercially available from Bayer in their ROSKYDAL line of products (ROSKYDAL LS 2298), from Sartomer Company, Inc. (CN966J75, or CN 981), or from UCB Chemicals, Inc. (EBECRYL 230, EBECRYL 8402 or EBECRYL 8804). The urethane(meth)acrylates can be aromatic or aliphatic. Other suitable (meth)acrylate moieties include (meth)acrylated epoxies, (meth)acrylated polyesters, (meth)acrylated amines, (meth)acrylated acrylics and/or mixtures thereof. Combinations of (meth)acrylate moieties can also be used. In certain embodiments, at least one (meth) acrylate moiety has a functionality greater than two and in certain embodiments at least two (meth)acrylate moieties are used, at least one of which has (meth)acrylate functionality greater than two.

The coating composition further comprises a pigment (sometimes referred to as a "filler" in the formulation). Suitable pigments/fillers include, for example, silicas, inorganic oxides, calcium carbonates, aminosilicates, zinc oxide, titanium dioxide, and the like. The pigment may or may not impart opacity, depending on the needs of the user. In certain embodiments, the pigment is used in a relatively high weight percent; that is, the pigment ranges from 20 to 60 weight percent, with weight percent based on total solid weight of the composition. It was surprising that the coating compositions of these embodiments retained the flexibility desired to reduce, if not eliminate, face checking of a wood product; typically, highly loaded systems (i.e. systems with a weight percent in this range) are relatively inflexible. "Reduce" and like terms used in reference to cracking refer to reducing the size of the crack(s) and/or reducing the number of crack(s).

The use of pigment/filler in the present compositions allows the desired viscosity to be achieved. The viscosity of the composition can be such that the composition can be pushed into or "filled" in the grain and/or pores of the wood. The viscosity of the coating can be for example 10,000 to 75,000 centipoises ("cPs"), such as 10,000 to 50,000 cPs, 20,000 to 50,000 cPs, 20,000 to 40,000 cPs, or about 30,000 cPs, +/−5,000 cPs, with viscosity measured with a Brookfield viscometer, for example a model RVT viscometer, with a No. 7 spindle at 50 RPM at 25° C. It will be appreciated that the viscosity of the coatings used in these embodiments is not as thick as, for example, a putty, but is thicker than a formulation lacking pigment/filler.

The coatings of the present invention can further comprise one or more diluents. Suitable diluents include, for example, glycerol propoxy triacrylate, propoxylated neopentyl diacrylate, 1,6 hexanediol diacrylate, isodecyl(meth)acrylate, isobornyl(meth)acrylate, lauryl(meth)acrylate, 2-phenoxyethyl acrylate, ethylene glycol di(meth)acrylate, 1,3-butylene glycol di(meth)acrylate, 1,4-butanediol diacrylate, 2,3-dimethylpropane 1,3-diacrylate, 1,6-hexanediol di(meth)acrylate, dipropylene glycol diacrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, tripropylene glycol di(meth)acrylate, thiodiethyleneglycol diacrylate, trimethylene glycol dimethacrylate, pentaerythritol tri(meth)acrylate, trimethylolpropane tri(meth)acrylate, ditrimethylolpropane tetra(meth)acrylate, glycerolpropoxy tri(meth)acrylate, ethoxylated trimethylolpropane tri(meth)acrylate, and tetraethylene glycol di(meth)acrylate, including mixtures thereof. Such diluents can be added, for example, to reduce or otherwise adjust the viscosity of the coating. In one embodiment, the coating comprises a (meth)acrylate moiety having a (meth)acrylate functionality greater than two, and a diluent having a (meth)acrylate functionality less than two.

The coatings used according to the present invention can further comprise various other additives standard in the art.

Examples include initiators, defoamers, wetters, inhibitors, thermoplastic resins, colorants, dyes, surfactants, and the like. When the coatings are cured by actinic radiation, such as by ultraviolet light, suitable photoinitiators include, for example, benzyl, benzoin, benzoin methyl ether, benzoin isobutyl ether benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, e.g., 2,6-dimethylbenzoyldiphenyl phosphine oxide, 2,4,6-trimethylbenzoyldiphenylphosphine oxide, bis(2,4,6-trimethylbenzoyl)phenyl phosphine oxide, 2,6-dichlorobenzoyl-diphenylphosphine oxide, and 2,6-dimethoxybenzoyldiphenylphosphine oxide, bisacylphosphine oxides, e.g., bis(2,6-dimethoxybenzoyl)-2,4,4-trimethylepentylphosphine oxide, bis(2,6-dimethylbenzoyl)-2,4,4-trimethylepentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof. The coatings can be cured by any crosslinking mechanism, for example, thermally. Suitable thermoinitiators include peroxides and amines. When used, these other additives are typically present in the composition in an amount of up to 30 weight percent, with weight percent based on the total solid weight of the composition. The composition can be water-based, solvent-based, or 100 percent solids.

The coating compositions can be prepared by any means known in the art. For example, the liquid components can be added to a tank with agitation; powder can then be added, followed by any other desired additives. Agitation can be continued until the blend is substantially homogenous, and, in certain embodiments, until it has a Hegman grind of 2 to 7.

The coatings can be applied to the wood product using any means standard in the art for a product having the desired viscosity such as pumping, pouring, and the like. A roll coat fill machine is a particularly suitable means of application.

The coating is typically applied in an amount of 0.5 to 5 mils, such as 1 to 2 mils, wet film thickness.

In certain embodiments, the wood product may be stained prior to treatment according to the present invention. For example, a stain may be applied first and cured or dried. The coatings described herein can then be applied to the stained wood product, generally to fill the pores and give the finished product a smooth full-filled look; the present coatings can then be cured, sanded and/or have other coatings applied to the wood product, such as decorative and/or protective coats. Generally, the protective layers comprise layers for abrasion resistance, sanding sealers and/or topcoats. The present coatings can also be applied to a wood product not having stain and/or any other treatment, and/or can also be used with other coatings, layers, and/or treatments.

The present invention is further directed to a wood product treated according to the present methods. In certain embodiments the wood product treated according to the present invention can undergo 10 hot and cold cycles, such as up to 20 cycles, with little or no face checking. In certain embodiments, a wood product treated according to the present methods and having a treated "face" of 40 square inches, +/−5 square inches, may have five or fewer cracks of 2 inches or less after ten hot and cold cycles. One "hot and cold cycle" refers to exposing the wood product to one hour at 120° F., one hour at −5° F., and 15 minutes at room temperature.

The coating used in the present invention has sufficient flexibility to expand and contract with wood upon exposure to various environmental conditions, such as humidity, heat, cold, and the like. As noted above, the cured coating has a Tg of less than 55° C., such as 35° C. or less, with Tg determined by dynamic mechanical analysis ("DMA") of free films according to methods standard in the art.

Certain embodiments of the present invention specifically exclude using a composition that comprises a hydrophilic polymer in conjunction with a reactive monomer. Other embodiments specifically exclude the use of an oligourethane acrylate with urea groups and/or a reactive polyester. It will be appreciated that the compositions used according to the present invention are not "stains" as that term is used in the art, which is used in a low viscosity form and is used typically to impart color to the wood product.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the invention has been described in terms of "a" (meth)acrylate moiety and "a" pigment, more than one (meth)acrylate moiety and/or more than one pigment can be used. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

A "flexible" filler according to the present invention was tested against two other commercially available fillers. All wood products tested were Southern Red Oak veneer, having applied thereto a stain, filler, high abrasion sealer, sanding sealer and topcoat. The wood product having a flexible filler according to the present invention and one of the other wood products having a commercially available "non-flexible" filler used coatings commercially available from PPG Industries, Inc.; other than the filler, all the coatings were the same for these two tested wood products. The third wood product was coated with products supplied by Chemcraft. Two boards for each system were tested, each board being approximately 40 in$^2$+/−5 in$^2$. Results were obtained by visual inspection, and reported results are an average of the two boards. Ten hot and cold cycles were run, with the results as shown.

TABLE 1

| Filler | Results | Comments |
|---|---|---|
| R1596Z-8 | 2 cracks, up to 1 inch in length | R1596Z-8 is commercially available from PPG Industries, Inc., and comprises a urethane acrylate and approximately 36 weight percent of filler. |
| R1340Z-8 | 20 cracks, varying in length from 1 to 3 inches | R1340Z-8 is commercially available from PPG Industries, Inc. and comprises an epoxy acrylate, a reactive polyester and approximately 25 weight percent of filler. This product is sold as a filler, and is not regarded as a "flexible" filler. |
| Chemcraft | 35 cracks, varying in length | Commercially available Chemcraft filler. |

TABLE 1-continued

| Filler | Results | Comments |
|---|---|---|
| | from 0.5 to 3 inches | |

Example 2

Southern Red Oak veneer was tested as described above, with the following results.

TABLE 2

| Filler | Results |
|---|---|
| R1596Z-8 | 2 cracks, both raised, neither split |
| R1340Z-8 | Up to 10 cracks, most raised, 3 split open |

Example 3

Southern Red Oak veneer was tested as described above using two fillers within the present invention with the following results.

TABLE 3

| Filler | Results | Comments |
|---|---|---|
| R1596Z-8 | 8 cracks less than 1 inch, 2 cracks at 1 inch | |
| R1623Z-8 | Up to 5 cracks between 0.5 and 2 inches | R1623Z-8 is commercially available from PPG industries, and comprises an acrylated polyester, and acrylated amine and epoxy acrylate, and approximately 50 weight percent of filler. |

Example 4

Three fillers, as shown in Table 4, were tested for Tg of free films using DMA on a TA Instruments 2980 Unit at the following parameters. Free films were obtained by drawdown on glass and were peeled after UV cure.
Mode: free film
Amplitude: 20 microns
Frequency: 1 Hz
Heating rate: 3° C./min
Sample dimensions: approximately 15×6.5×0.050 mm

TABLE 4

| Sample | Tg (° C.) |
|---|---|
| R1340Z-8 | 55 |
| R1623Z-8 | 35 |
| R1596Z-8 | 33 |

Whereas particular embodiments of this invention have been described above for purposes of illustration, it will be evident to those skilled in the art that numerous variations of the details of the present invention may be made without departing from the invention as defined in the appended claims.

What is claimed is:

1. A method for reducing face checking of a wood product comprising:
   (a) filling the grain and/or pores of the wood with a composition having a viscosity of 10,000 to 75,000 cPs and comprising a (meth)acrylate moiety and a pigment, and
   (b) curing the composition by actinic radiation to provide a cured composition having a Tg of less than 55° C., wherein the wood product comprises at least two ply comprising an outermost ply comprising wood.

2. The method of claim 1, wherein the (meth)acrylate moiety comprises urethane acrylate.

3. The method of claim 2, wherein the urethane acrylate is aliphatic.

4. The method of claim 2, wherein the urethane acrylate is aromatic.

5. The method of claim 1, wherein the composition comprises at least two (meth)acrylate moieties, at least one of which has a (meth)acrylate functionality greater than two.

6. The method of claim 1, wherein the composition comprises (meth)acrylated epoxy, (meth)acrylated polyester, and (meth)acrylated amine.

7. The method of claim 1, wherein the weight percent of pigment in the composition is 20 to 60 weight percent, with weight percent based on total solid weight of the composition.

8. The method of claim 1, wherein the composition has a viscosity of 10,000 to 50,000 cPs.

9. The method of claim 1, wherein the composition has a viscosity of 20,000 to 40,000 cPs.

10. The method of claim 9, wherein the viscosity of the composition is 30,000 cPs +/−5000 cPs.

11. The method of claim 1, further comprising staining the wood product prior to application of the composition comprising a (meth)acrylate moiety and a pigment.

12. The method of claim 1, wherein the Tg of the cured coating is 35° C. or less.

13. The method of claim 1, wherein the (meth)acrylate moiety has a (meth)acrylate functionality greater than two.

14. The method of claim 13, wherein the composition further comprises a diluent having a (meth)acrylate functionality less than two.

15. The method of claim 1, wherein the filling step comprises applying the composition with a roll coat fill machine.

16. The method of claim 1, wherein the wood product, after the composition has cured, has less than 5 cracks of 2 inches or less after 10 hot and cold cycles, and wherein the wood product has a treated face of 40 square inches +/−5 square inches.

17. The method of claim 1, further comprising applying a protective coating layer to the wood product after curing the composition.

18. The method of claim 1, wherein the wood product comprises veneer.

* * * * *